W. H. HOWELL.

Assignor to W. WILKESON.

PULP GRINDER.

No. 10,713. Reissued Apr. 20, 1886.

Witnesses.

Theodore L. Popp.

Geo. J. Buchheit Jr.

William Harman Howell Inventor.

By Wilhelm & Bonner

Attorneys

UNITED STATES PATENT OFFICE.

WILLIAM HARMAN HOWELL, OF THOROLD, ONTARIO, CANADA, ASSIGNOR TO WILLIAM WILKESON, OF YOUNGSTOWN, NEW YORK.

PULP-GRINDER.

SPECIFICATION forming part of Reissued Letters Patent No. 10,713, dated April 20, 1886.

Original No. 314,844, dated March 31, 1885. Application for reissue filed February 18, 1886. Serial No. 192,448.

*To all whom it may concern:*

Be it known that I, WILLIAM HARMAN HOWELL, of Thorold, in the county of Welland, Province of Ontario, Dominion of Canada, have invented a new and Improved Pulp-Grinder, of which the following is a full, clear, and exact description.

My invention relates to a pulp-grinding mill in which the running-stone is of conical form and surrounded by a hollow fixed stone or shell of corresponding shape. The object of my invention is the construction of a pulp-mill of this kind which is easily adjusted, simple and durable in construction, and efficient in its operation.

My invention consists to that end of the improvements which will be hereinafter fully set forth, and pointed out in the claims.

Figure 1:
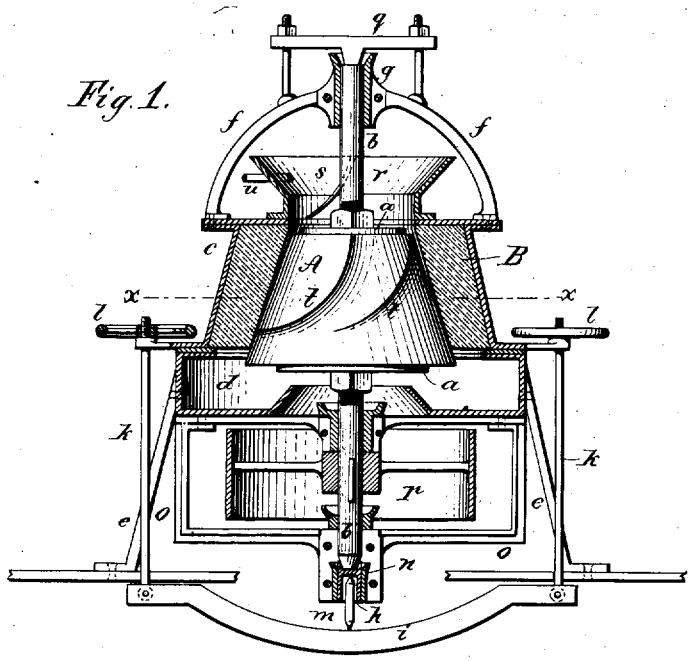
Figure 2:
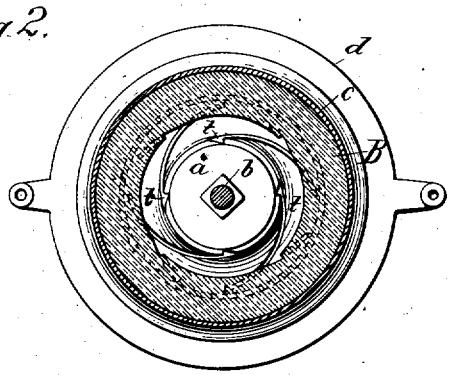

In the accompanying drawings, Figure 1 is a sectional elevation of a pulp-grinder provided with my improvements. Fig. 2 is a horizontal section in line *x x*, Fig. 1.

The conical running-stone A is clamped by nuts between flanges *a* on the spindle *b*, and the hollow conical bed-stone or shell B is arranged within a metallic casing, *c*, which is bolted upon an annular receiving spout or trough, *d*. The latter forms the middle frame of the machine, and is supported upon legs *e*.

To the top of the casing *c* are attached bridge-trees *f*, which carry the upper bearing, *g*, of the spindle. The lower end of the spindle rests in a step, *h*, which is sustained by a cross-bar, *i*. The latter is supported by tightening-screws *k*, which are provided with hand-nuts *l*, so that the step and spindle can be raised and lowered, thereby adjusting the cone in the shell.

The step *h* is composed of a hollow sleeve carrying steel disks upon which the spindle rests, and the step in turn rests upon a center, *m*, the latter supporting the sleeve in the upper part thereof to prevent tipping. The step *h* is arranged within a box, *n*, which is sustained by hangers *o* from the trough *d*. The driving-pulley *p* is arranged within the hangers *o*, and is attached to the spindle by a feather or key, so as to allow the spindle to move lengthwise through the hub of the pulley.

*q* represents a cross-bar, which is secured to the bridge-trees *f*, and limits the upward movement of the spindle.

The casing *c* is provided with a receiving or feed hopper, *r*, formed on its sides with inclined or curved flanges *s*, which force the material downward between the upper ends of the stone.

The runner A is constructed with curved furrows *t*, and the shell B is provided on its inner side with similar furrows running in opposite directions to the furrows of the runner.

*u* represents a pipe which supplies water or a chemical solution to the hopper *r*, whence it passes between the grinding-faces of the stones for cooling the same.

I claim as my invention—

1. The combination, with the conical shell B and the annular receiving-trough *d*, secured to the lower end thereof, of the conical runner A, a spindle, *b*, to which the runner is secured, and a vertically-movable step upon which the spindle is supported, substantially as set forth.

2. The combination, with the conical shell B and the annular receiving-trough *d*, secured to the lower end thereof, of the hangers *o*, secured to said trough, the bearing *n*, supported by said hangers, the vertically-movable step *h*, arranged in said bearing, the conical runner A, and the spindle *b*, resting on the step *h*, substantially as set forth.

3. The combination, with the conical shell B and the annular receiving-trough *d*, secured to the lower end thereof, of the hangers *o*, secured to said trough, the bearing *n*, supported by said hangers, the vertically-adjustable bar *i*, supporting the step *h*, and the conical runner A and spindle *b*, substantially as set forth.

4. The combination, with the conical shell B and annular receiving-trough *d*, secured to the lower end thereof, of the hangers *o*, depending from the trough *d*, a pulley, *p*, arranged between said hangers, the conical runner A, and spindle *b*, and a vertically-adjustable step-bearing, *h*, attached to the hangers *o* below said pulley, substantially as set forth.

5. A pulp-grinder consisting, essentially, of the conical running-stone A, shaft *b*, to which said stone is clamped, the fixed stone B, surrounding the said running-stone, the casing *c*, surrounding the fixed stone, spout *d*, secured to the lower edge of said casing, the hangers *o*, secured to the under side of spout *d*, cross-bar *i*, the vertically-adjustable rods *k*, connecting the outer ends of the cross-bar with the frame above said cross-bar, step *h* in the hangers *o*, center *m* between the step and cross-bar *i*, pulley *p* on the shaft *b*, within the hangers *o*, the bridge-trees *f*, mounted on top of casing *c* and provided with the bearing *g*, and cross-bar *q*, bearing on the upper end of shaft *b*, to prevent vertical movement thereof, and a hopper, *r*, substantially as set forth.

6. The combination, with the conical running-stone A and the hollow conical fixed stone surrounding the same, of the hopper *r*, provided with the inclined flanges *s*, extending from the top to the bottom of the hopper and acting to force the material into the space between the stones, and the pipe *u*, for directing a stream of water between the stones to cool them, substantially as set forth.

Witness my hand this 22d day of January, 1886.

WILLIAM HARMAN HOWELL.

Witnesses:

JNO. J. BONNER,

CARL F. GEYER.